UNITED STATES PATENT OFFICE.

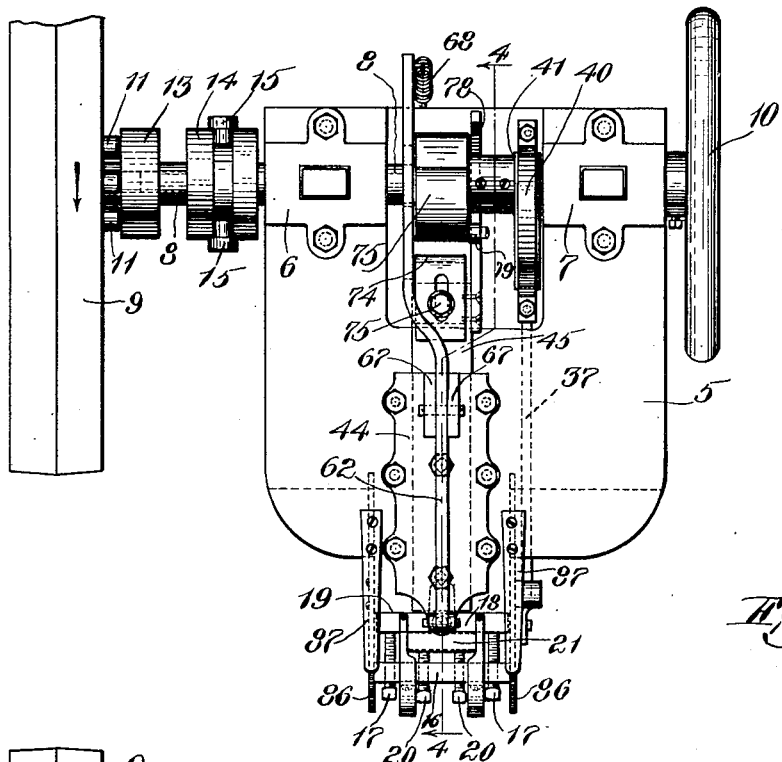

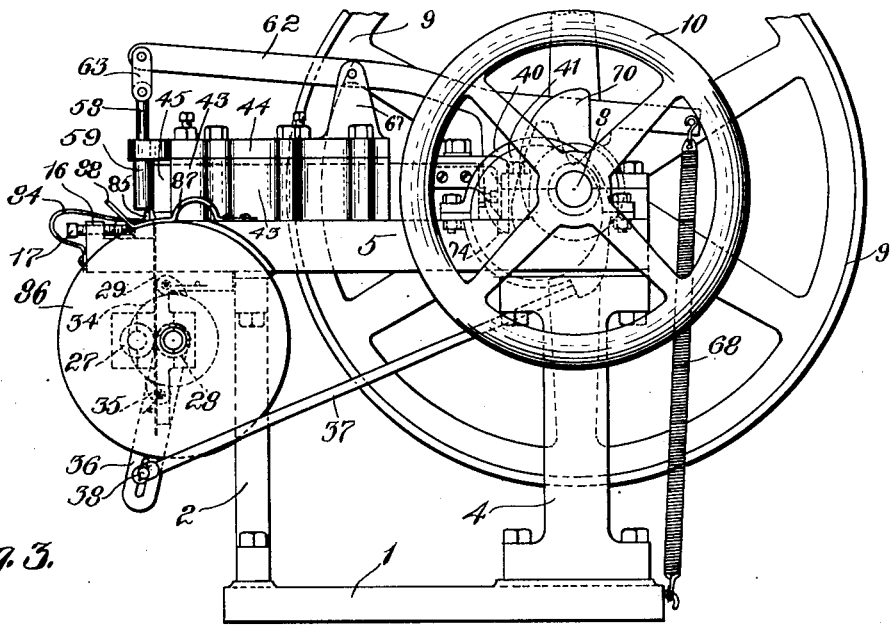

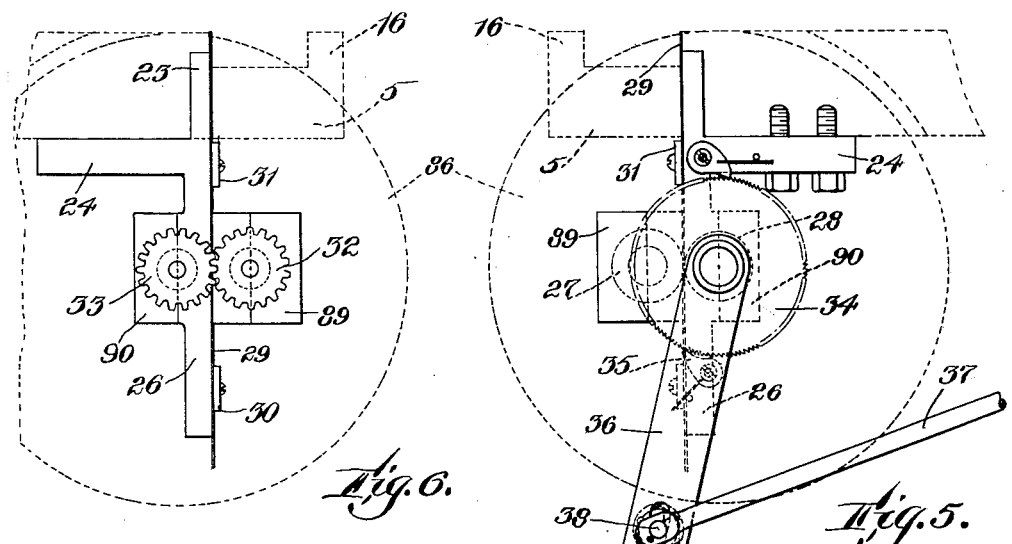

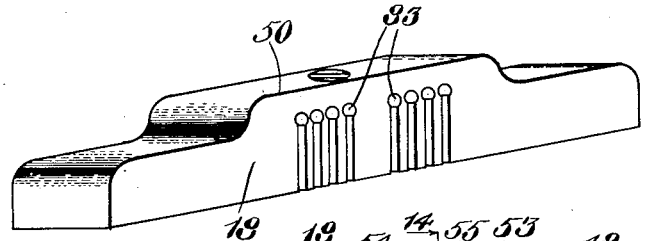
Fig. 11. Fig. 12.
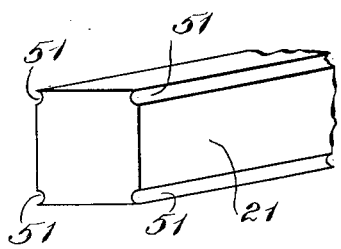
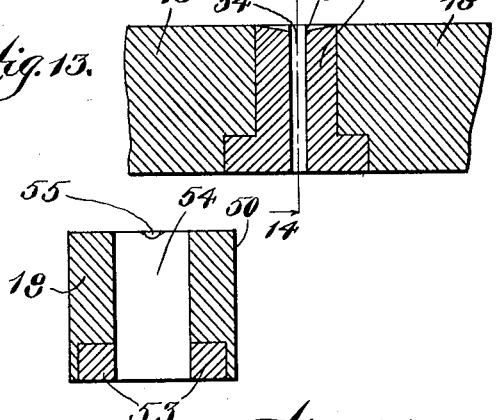
Fig. 13.
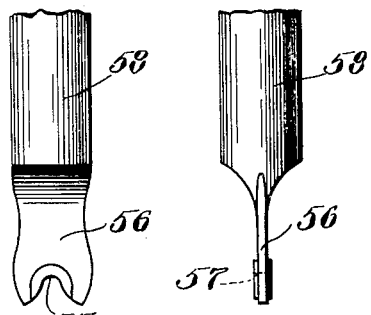
Fig. 15. Fig. 16. Fig. 14.
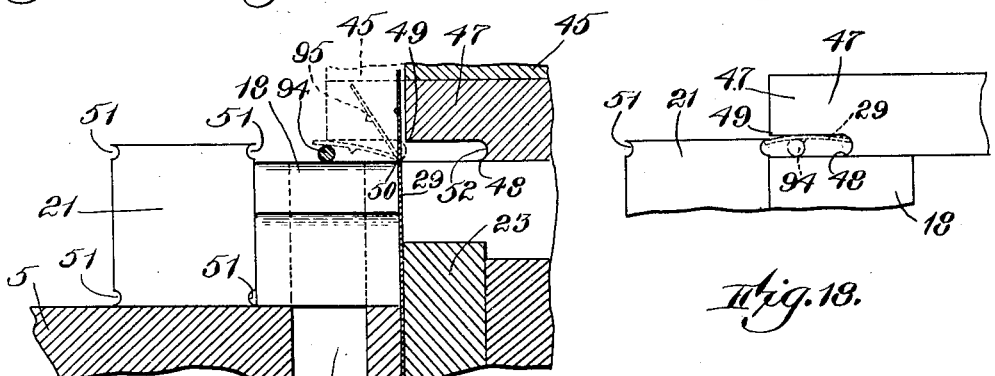
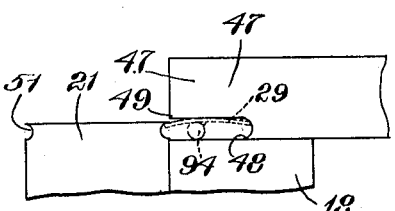
Fig. 18.
Fig. 17.
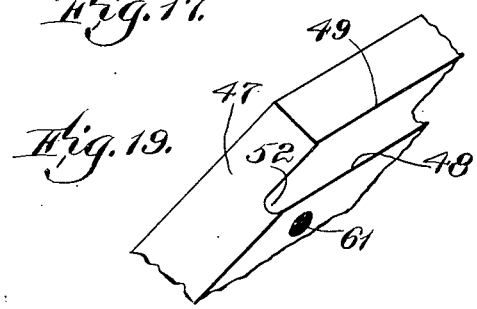
Fig. 19.
Inventor:
George G. Perkins
By Wright, Brown, Quinby & May
Attorneys.

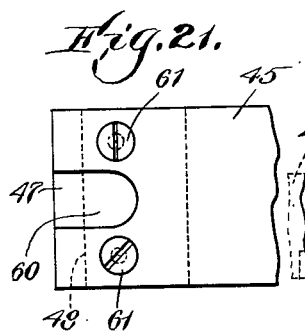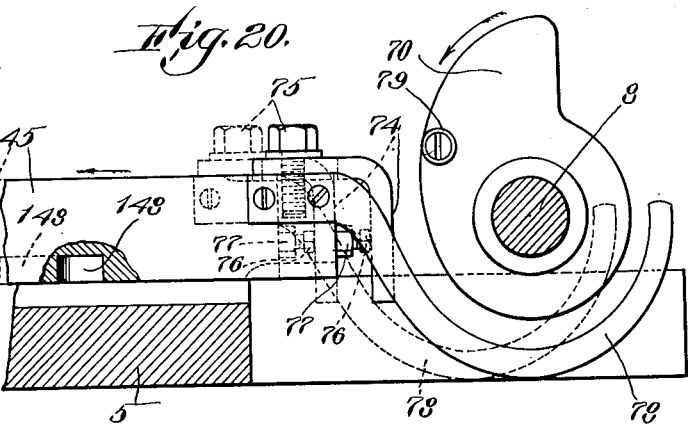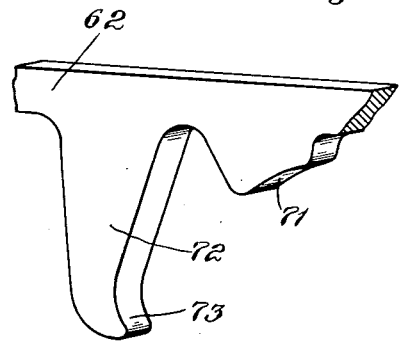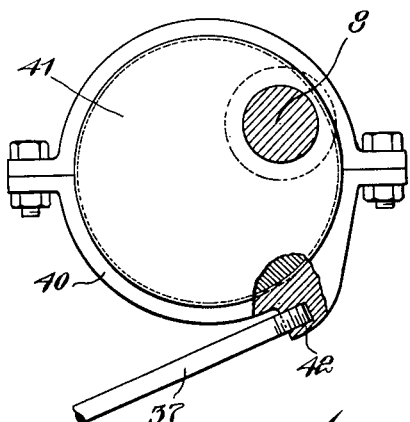

GEORGE G. PERKINS, OF LYNN, MASSACHUSETTS.

LACING-TIP-FORMING MACHINE.

1,347,655.

Specification of Letters Patent.　　Patented July 27, 1920.

Application filed May 11, 1918.　Serial No. 233,829.

*To all whom it may concern:*

Be it known that I, GEORGE G. PERKINS, a citizen of the United States, residing at Lynn, in the county of Essex and State of Massachusetts, have invented new and useful Improvements in Lacing-Tip-Forming Machines, of which the following is a specification.

This invention has reference to machines for forming tips on lacings by applying metal or other tip bindings to lacings of the sort which are used for shoes, and other articles of clothing to which lacings may be applied, so as to gather in or close certain openings, such bindings being pieces of sheet metal or other sheet material having sufficient stiffness, of suitable dimensions which surround and bind the ends of lacings to prevent raveling of the webbing at the ends thereof and to enable such ends to be readily inserted in the eyelets of shoes and other garments or articles. It is the object of the present invention to provide an improved machine adapted to apply at one operation a metal binding as wide as the length of two of such tips to a part of the webbing or cord of which the lacing is made, and then to sever the applied binding and the inclosed webbing or cord in such manner as to make two separate tips. The invention consists in means and combinations in association adapted to accomplish the above stated object, and in the specific embodiment of such means and combinations described in the following specification, together with all equivalents and modifications within the scope of the appended claims.

In the drawings which form a part of this specification Figure 1 is a front elevation of a machine embodying my invention in one of the forms which I may employ. Fig. 2 is a plan view of said machine. Fig. 3 is a side elevation as seen from the right of Figs. 1 and 2. Fig. 4 is a longitudinal section on line 4—4 of Figs. 1 and 2. Figs. 5 and 6 are elevations as viewed from the right and left hand sides of the machine respectively of the strip feeding mechanism on a larger scale than the preceding figures. Fig. 7 is a sectional view of the bearings for the strip feeding rolls. Fig. 8 is a perspective view showing the work support and the punch and die for cutting the applied binding. Fig. 9 is a plan view in detail of the prick punch which indents the binding strip. Fig. 10 is a perspective view showing two completed lacing tips in the positions relative to one another which they occupy upon completion. Fig. 11 is a perspective view of part of the anvil block by the aid of which the binding is wrapped on the lacing. Fig. 12 is a perspective view of the work support and die. Fig. 13 is a section of the die and of the adjacent parts of the support taken on the longer median line of the latter. Fig. 14 is a cross section of the die and support on line 14—14 of Fig. 13. Figs. 15 and 16 are elevations, viewed from directions at right angles to each other, of the punch. Fig. 17 is a fragmentary sectional view showing the former and anvil in coöperative action. Fig. 18 is a view similar to Fig. 17, and showing the same parts in a different position. Fig. 19 is a perspective view of the operating end of the former. Fig. 20 is a fragmentary elevation of the means for operating the former. Fig. 21 is a plan view of the front end of the former carrier with the former applied thereto. Fig. 22 is a perspective view of a part of the punch operating lever. Fig. 23 is an elevation of the eccentric and strap by which the strip feed is operated.

The same reference characters designate the same parts wherever they occur in the drawings.

The machine comprises a base 1 which may be so made as to rest on the floor or on a bench. Rising from the base are standards 2, 3, 4, which support a table 5 whereon are mounted the working parts of the machine. So far as the principles of the invention are concerned, the table 5 is the bed of the machine, and the parts below it merely are means indicative in a general way of any means for the purpose, designed to support the machine.

On the rear end of the table are provided bearing boxes 6, 7 in which is mounted the main driving shaft 8 carrying on one end a driving pulley 9 and on the other end a hand wheel 10 to enable the shaft to be turned, and the parts operated by the shaft to be moved, by hand when necessary. The pulley 9 is mounted loose on the shaft and is adapted to be driven constantly by a belt, and to be coupled to the shaft whenever it is desired to operate the machine, by a clutch mechanism of any suitable character. For illustration I have shown one form of clutch suitable for the purpose comprising studs 11 fixed to the pulley and a complemental stud 12 arranged to slide through a collar 13 fixed to the shaft and to be either projected so that its end engages with one or another of the studs 11, or to be withdrawn so that it clears such studs, the latter being clear of the collar 13 as illustrated. The clutching stud 12 is secured to a sleeve 14 by which it may be advanced and retracted, such sleeve being loose on the shaft, or at least adapted to slide axially thereon, and being operated by a lever 15 in a well known manner.

At the forward end of the table is a ledge 16 through which pass clamp screws 17, 17 arranged to hold in place a work support or die block 18 against shoulders 19 suitably formed on the table. The same ledge also supports clamp screws 20, 20 which secure an anvil block 21 against the forward side of the work support or die block 18. An opening 22 is formed in the table beneath and partly in rear of the central portion of the support, and into this opening a strip guide 23 projects upward from a bracket 24 secured to the under side of the table. This bracket has also a down-hanging apron 26 carrying bearings for the strip feeding rolls 27 and 28.

A strip 29 of sheet metal, or other material adapted to be applied upon a lacing and rolled into a tip binder for the same is fed by the rolls 27 and 28 along the apron and guide past the rear side of the work support so as to project above the same. Plates 30, 30 and 31, 31 are adjustably mounted on the forward side of the apron by screws passing through slots in such plates to guide and confine the strip.

The feed rolls are geared together at one side of the machine as shown in Fig. 6 by pinions 32, 33, respectively, and on the trunnion of one of them at the other side of the machine is mounted a ratchet wheel 34, shown in detail in Fig. 5, which is driven step by step by a pawl 35 carried by a pawl carrier made as an arm 36 which swings on the trunnion of the roll and is oscillated by a rod 37 having an adjustable wrist connection with the pawl carrier by a pin 38 which is adapted to be fixed in various positions in a slot 39 in the arm. This rod is attached to an eccentric strap 40 which surrounds an eccentric 41 on the main drive shaft 8. In order to bring the eccentric rod entirely beneath the table and avoid interference with other parts, the strap is formed with a boss 42 at one side, in which the end of the rod 37 is secured, so that such rod is set over to the side of the eccentric instead of being substantially radial thereto as is the common practice.

On the upper side of the table is a guideway formed by upright walls 43, 43 and a cover plate 44 secured thereto, and in such guideway are mounted two slides 45 and 46 one above the other. The first of these slides is notched on the under side of its forward end and carries in such notch a piece 47 which for the purpose of this description I will call a "former," because its principal function is to form the tip by cutting off a sufficient length of the strip 29 and rolling it about the lacing. This former is shown best in Figs. 17, 18, and 19. Its forward end is recessed at the under side, so as to provide at the rear end of the recess a cutting edge 48, and at the forward end thereof a bending nose 49. The cutting edge is located so as to pass across the upper surface of the work support or die block 18, over the raised central part thereof, and coöperate with the edge 50 of such raised part to shear off a length of the strip. For this purpose the surface of the work support and the edge 50 are placed close to the plane in which the edge 48 extends and moves. The bending nose 49, being above the surface of the work support or die block is adapted to pass over the same and over a lacing laid thereon, and also across the anvil block 21, which rises above the surface of the work support or die block. In that part of the anvil block which rises above the work support or die block is a forming groove 51 which coöperates with the forming groove 52 in the former adjacent to the edge 48 to roll the binding strip upon the lacing. This anvil block may be reversible and invertible, and provided with forming grooves in each of its opposite sides adjacent to the bounding edges thereof as shown in Fig. 17 if desired, in order that after one groove becomes enlarged by wear, or otherwise defaced or injured, the anvil may be so turned as to substitute another one. The mode of securing the anvil by the binding screws 20, as already described, enables this reversal to be readily made.

In the work support or die block 18 is set a die 53 having a slot 54 extending through it, and in the upper end of which are tapering grooves 55 leading from the opposite sides of such slot. The die is in fact practically divided in two parts by the slot, but such parts are secured together by a flange at the base of the die.

Coöperating with the die is a punch 56 having a notch 57 in the end which is adapted to enter the slot in the die. Said punch is formed upon or attached to a shank 58 which passes and slides through a guide sleeve 59 fixed in a forward extension of the cover plate 44 projecting toward the table. This guide sleeve terminates above the former so that the same passes under it, while the forward end of the former-carrying slide is notched at 60 to accommodate said sleeve. The screws 61 which attach the former to its carrying slide pass through the slide at opposite sides of this notch.

An operating lever 62 for the punch is connected to the shank of the lever by a link 63 and pivot pins 64, 65, and is pivoted on a fulcrum stud 66 between lugs 67 rising from the cover 44. A spring 68 is attached to the opposite arm of this lever from that which is connected to the punch, and is also connected to the machine base, so that it tends always to retract the punch from the die. Operation of the lever and punch in the opposite directions is effected by a stud 69 projecting from the side of a cam 70 on the drive shaft beneath the lever. The under side of the lever is formed with a cam or wiper surface 71 (Figs. 4 and 22) so shaped as to be engaged by the stud 69 in the rotation of the latter. In wiping under this surface the stud lifts the same and thereby rocks the lever 62 so as to depress the punch, the form and extent of this cam surface being properly proportioned to give the required extent of motion to the punch. Adjacent to the cam surface 71 is a finger 72 projecting downwardly from the lever and having a curved end 73 which is brought into the path of the stud 69 whenever the cam surface is raised. The purpose of this finger is to cause the operating stud to give a positive initial withdrawing impulse to the punch in case the latter should be held by a scrap of the binding or a bit of fiber from the lacing which may be crowded between the surface of the punch and die so firmly as to resist the effort of the spring to withdraw the punch. Cam 71 and finger 72 are here shown as integral parts of the lever 62, but obviously they need not be so made, but may as well or better be separate pieces, or parts of the same separate piece properly secured to the lever.

Cam 70 previously mentioned serves to work the slides 45 and 46, and it applies its impulse in the working direction upon a foot 74 made as an angle plate mounted adjustably by a set screw 75 on the slide 45, and having a down turned end back of the rear end of the slide in the same zone with the cam. This angle plate also bears against an adjustable abutment 76 constituted by a set screw threaded into the slide, and carrying a locking nut 77. For withdrawing the slide there is provided a hook or curved finger 78 secured to the side of the slide and in the same plane with the circular path of rotation of a stud 79 which projects from the side of the cam. The rear end part of this curved finger is brought to intersect the path of said stud when the slide is advanced, as shown in Fig. 20, whereby the stud is adapted to engage the finger and so move it as to withdraw the slide.

The end of the foot or angle plate 74 also actuates the slide 46 during the forward travel of slide 45, by engaging an adjustable abutment 80, which is formed as a set screw threaded into the rear end of said slide. Slide 46 carries a pin 147 which projects into a notch 148 in the slide 45, said notch being longer than the width of the pin, whereby lost motion is provided for, and the forward side of the notch striking the pin withdraws slide 46 when slide 45 is withdrawn. This lost motion allows the latter slide to begin its forward movement before the other slide is moved at all, whereby it has a greater extent of travel than the other.

Slide 46 carries a prick punch 81 having sharp points 82, the function of which is to penetrate the strip which forms the binding and forms burs on that side of the strip through which the points emerge. While the strip is being thus pricked it is backed up by the work support or die plate 18, and the latter has recesses 83 in its side to receive without injury to the same the points of the prick punch after they have passed through the strip, and also to leave the metal unsupported immediately adjacent to said punch so that the burs referred to will be made in a pronounced form.

Attached to the forward edge of the table 5 are guard or guide strips 84 which extend around the edge of the lip 16 and over the anvil and the ends of the work support 18 across the end portions of such support and beside the raised central part thereof, carrying gage pins 85. On the opposite ends of the feed roll 28, or the trunnions of said feed roll, are mounted feed wheels 86, 86 the upper limits of which are approximately tangent to the plane of the work supporting surface. These feed wheels are partly overhung by lateral wings of the table 5, and on these wings are secured spring retainer strips 87 which project forwardly, each over one of the feed wheels, and are so near the latter as to press against a lacing which is caused to pass between said strips and the wheels. The extreme ends 88 of these retainer strips are bent up so as to form with the circumference of the wheels flaring throats into which the lacing may be easily passed. These wheels of course rotate intermittently in unison with the strip feeding rolls, and their motion is so timed as to take place when the slides 45 and 46 are withdrawing after having completed a working stroke.

A detail of the bearing boxes for the feeding rolls is shown in Fig. 7. The bearing for each roll is formed partly in ribs on the forward and rear sides of the apron 26, respectively, and the caps 89 and 90 for these bearings are secured by screws 91, 91 and 92, 92, respectively. As the roll 27 may yield so as to maintain an even pressure on strips which may vary in thickness, the shanks of screws 91 are made sufficiently long to provide room for springs 93, 93 confined between the heads of said screws and abutting surfaces on the box cap 89. Thus the cap is adapted to yield outwardly and to permit yielding of the roll 27 when the strip is of more than the minimum thickness.

The operation of the machine is thus. A strip being introduced into the feed mechanism from a roll or other form of supply, not shown, is fed intermittently past the work support 18. The extent of feed is adjusted to furnish a great enough length of strip to wrap around the lacing, confining the same tightly, and provide for overlap. After the feed has ceased, and while the driving pawl is being withdrawn preparatory to a fresh feed, the slide 45 is advanced, and soon after the same has started, the slide 46 is advanced also. Previously to this, however, the machine attendant has placed a piece of the cord or webbing from which the lacings are made upon the guard strips 84 against the gage pins 85 and between the feed wheels 86 and the retainer strips 87. Thus the lacing is positioned to rest on the upper surface of work support 18 and across the center of the die, being directly over the grooves 55 in the end of said die. The lacing is drawn straight in being so placed, and the operator may then release it while preparing another length of the lacing for insertion.

When the slide 45 comes forward it causes the bending nose 49 of the former first to bend over the upstanding end of the strip 29, as indicated by dotted lines in Fig. 17, bending it farther and farther until the nose is over the lacing 94. About that time the sharp edge 48 reaches the strip, and thereupon coacts with the edge 50 of the work support to shear off a length of the strip, and the surface adjacent to this cutter, passing under the edge of the severed piece tips up the back edge and lowers the front edge until the latter is below the upper edge of the forming groove 51 in anvil block 21. As the former continues to advance the edge of the binding piece is carried into groove 51, as shown in Fig. 14, and both opposite edges are then bent down and toward one another around the lacing, and one of these edges is overlapped around the opposite edge. During this action the burs 95 formed by the prick punch in the preceding operation engage the lacing and displace it somewhat so that the binding strip is applied in the necessary position. These burs thus perform the double function of properly placing the lacing with respect to the binding, and of indenting the lacing after the binding has been applied, so as to make the lock of the latter more secure. After the former has advanced far enough to squeeze the binding strip upon the lacing with as much firmness as necessary, it is withdrawn, and as soon as it has passed from over the die, the punch descends and cuts in two the binding and the interposed lacing. Before this has happened, however, the feed has been started in motion again and the feed wheels have drawn upon the lacing so as to straighten it and return the part surrounded by the binding strip into place above the die. Thus the punch in descending is enabled to receive the lacing in its notch 57. The peculiar shape of this die by reason of said notch, and the groove 55 in the die cause the cut tips of the lacings to be reduced in diameter in substantially circular outline instead of being flattened in the way which they would be if cut by straight shear blades.

It will be noted from Figs. 8, 15, and 16 that the part of the die on which the cutting edges are formed is thicker than the parts immediately adjacent thereto. This thickened part fits closely between the sides of the slot 54 in the die, and its opposites edges coact with the opposite edges of the entrance to such slot in cutting the lacing. This construction reduces the area of contact between the punch and die, limiting the friction and diminishing opportunity for chips of metal and bits of thread and fiber to be jammed between such surfaces. The small fragment which is thus removed by the action of the punch and die falls through the slot and through the opening in the table beneath it.

While the former is being moved forward, and as it approaches the end of its travel in that direction, the prick punch is advanced to indent or penetrate a part of the strip below, or back of, the piece which has been cut off; so as to form the burs in that part of the strip which furnishes the binding used in the next operation. Thus in each cycle a part which had previously been pricked is severed from the strip and wrapped about the lacing, and an adjacent part of the strip is pricked preparatory to being thus cut off and wrapped.

As soon as the punching operation has been performed, the continued rotation of the feed wheels pulls the divided end of the lacing around the gage pins 85 and away, leaving the work support clear for the placement of another lacing to be found and severed.

The machine thus described is particularly intended to be employed in connection with a method of making shoe lacings which consists in winding a length of webbing or cord into a skein or hank, and then feeding successive stretches of such skein or hank to the operating tools. Each operation divides the stretch or strand operated on into two ends with a tip binding on each, and being carried on, each turn or wrapping of the skein becomes a complete lacing having tip bindings at opposite ends. For this reason the machine is designed to facilitate feeding of the cords or strings to be operated upon transversely to the length of the cord. However so far as the other novel features of construction, arrangement and operation of the machine are concerned, the invention is not restricted to this particular manner of feeding in the cord, nor limited as to the character, type, or description of cord, string, or webbing which may be operated on. In this description and in the following claims the term "lacing" is intended to include any form of string, cord, or webbing, whether woven, twisted, or braided and whether round or flat, which is capable of being used for the purposes of a shoe lacing, corset lacing or any draw string or tie string, and in fact anything of similar characteristics which is adapted to be provided with a binding at its tip.

Although I have described in detail one particular embodiment of the invention, I would state that I do not restrict my claim herein to that particular embodiment only, but I include all means and devices however constructed and arranged which contain the essential principles of this particular machine as recited in the following claims.

What I claim and desire to secure by Letters Patent is:

1. A machine for tipping shoe lacings comprising a stationary work support, means for holding a lacing in a stretched condition on said support, means for applying a binder about the lacing so held, and means for severing the lacing and binder between the ends of the latter while the lacing is so held.

2. A machine for tipping lacings comprising complemental forming members having uninterrupted cutting and forming edges and surfaces adapted to receive a lacing and a binder between them, and operable to wrap the binder about such lacing, and severing means arranged and operable in a line between said forming members, whereby to sever the lacing and binder while the same remains approximately in the binder-receiving position.

3. A machine for tipping lacings comprising a work support on which a lacing may be placed, an anvil at one side of said work support, a former at the other side of said work support, means for feeding a strip between said work support and the former, means for moving said former across the work support toward the anvil, and former having a shearing edge complemental to the work support for shearing a binding piece from said strip, whereby the former in coöperation with the anvil is caused to roll the severed binder around the lacing, and a cutter complemental to the work support arranged to advance toward the same when the former is withdrawn, said support having a cutting edge with which said cutter coöperates in severing the bound part of the lacing and leaving two tips.

4. A machine for forming tips on lacings comprising an anvil having a forming groove, a former having a complemental forming groove and a continuous uninterrupted cutting edge at one boundary of said groove, means for advancing the former toward the anvil and retracing it, a work support having a continuous shearing edge complemental to the aforesaid edge arranged between the anvil and former in position for the former to travel over it, means for feeding a binding strip between said work support and former, whereby the former is enabled to produce a binding piece and wrap it about a lacing placed upon said work support, a cutting punch movable toward and away from said work support, and means for advancing said cutting punch toward the work support when the former has been withdrawn after applying a binder, whereby to sever the bound part of the lacing into two tips.

5. In a lacing-tip forming machine the combination with a work support of stationary gage members arranged with relation to said support to position a lacing properly thereon, grippers at opposite sides of said support for holding the lacing in place, and instrumentalities for applying a binder to the lacing so held and severing the bound lacing.

6. In a lacing-tip forming machine the combination with a work support of gage members arranged with relation to said support to position a lacing properly thereon, grippers at opposite sides of said support for holding the lacing in place, and instrumentalities for applying a binder to the lacing so held and severing the bound lacing, said grippers each comprising complemental grippers formed with a tapering entrance, and one of them being adapted to yield away from the other, whereby to facilitate placement and removal of the lacing.

7. In a lacing-tip forming machine the combination with a work support of gage members arranged with relation to said support to position a lacing properly thereon, grippers at opposite sides of said support for holding the lacing in place, and instrumentalities for applying a binder to the lacing so held and severing the bound lacing, said grippers each comprising two members one of which bears yieldingly against the other, and the latter of which is movable transversely to the direction of the lacing when so held, whereby movement of the movable member is effective first to draw the lacing taut across the gage members, and then to displace the tipped lacing.

8. In a lacing-tip forming machine the combination with a work support of gage members arranged with relation to said support to position a lacing properly thereon, grippers at opposite sides of said support for holding the lacing in place, and instrumentalities for applying a binder to the lacing so held and severing the bound lacing, said grippers each comprising a wheel and a complemental spring clamp bearing upon the periphery of said wheel in approximate alinement with the supporting surface of said work support, the spring clamp having a terminal part diverging from said periphery to guide the entrance of the lacing into the gripping position, and means for turning the wheels of both grippers step by step in timed relation to the operation of said instrumentalities whereby to displace the tipped lacing after such operation leaving a clear space for insertion of another lacing.

9. In a lacing-tip forming machine the combination with a work support, an anvil at one side of the support and a complemental former reciprocating toward and away from said anvil over the support, of guide members fixed in position and extending across said anvil, and gaging stops on said guide members beside the position in which a lacing is required to be placed on the work support.

10. A lacing-tip former comprising the combination with complemental forming members, relatively movable together and apart, of complemental severing cutters having a shearing action and being relatively movable transversely to said forming members and between the same when said members are separated, and mechanism for actuating the movable forming member and the movable cutter in required sequence.

11. A lacing-tip former comprising the combination with complemental forming members, relatively movable together and apart, of complemental severing cutters relatively movable transversely to said forming members and between the same when said members are separated, and mechanism for actuating the movable cutter in required sequence, the means for moving said movable cutter being a lever, a cam acting upon said lever, and a finger on said lever engageable by said cam for withdrawing the movable cutter in a positive manner.

12. A lacing-tip former comprising the combination with complemental forming members, relatively movable together and apart, of complemental severing cutters relatively movable transversely to said forming members and between the same when said members are separated, and mechanism for actuating the movable forming member and the movable cutter in required sequence, said movable cutter being guided to travel in a fixed path and the means for actuating it comprising a pivoted lever connected thereto, and a rotatable member having an impulse-applying stud, said stud being arranged to act on a part of the lever to advance said cutter, and the lever having a finger which is placed in the path of said stud by the aforesaid movement of the lever and is then acted upon by the stud to initiate positively the withdrawing movement of the cutter.

In testimony whereof I have affixed my signature.

GEORGE G. PERKINS.